July 20, 1943.    A. J. HAYNES    2,324,581
PHOTOMETER
Filed June 13, 1939
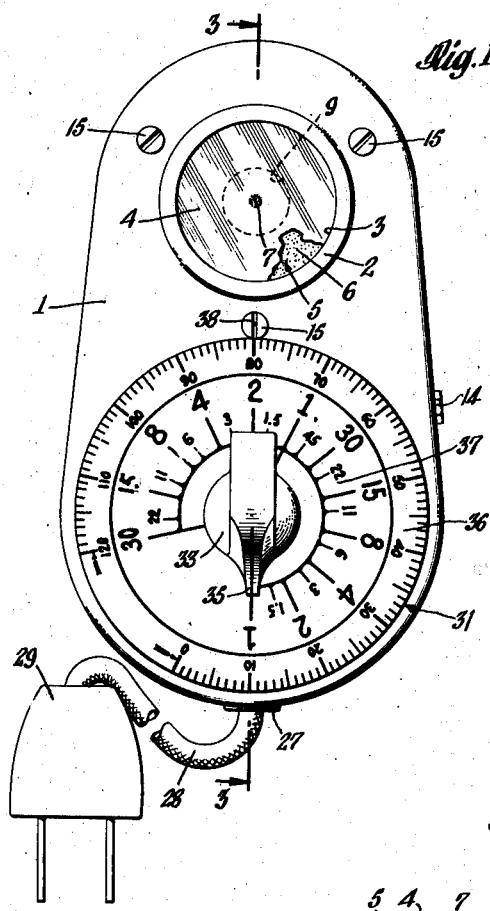
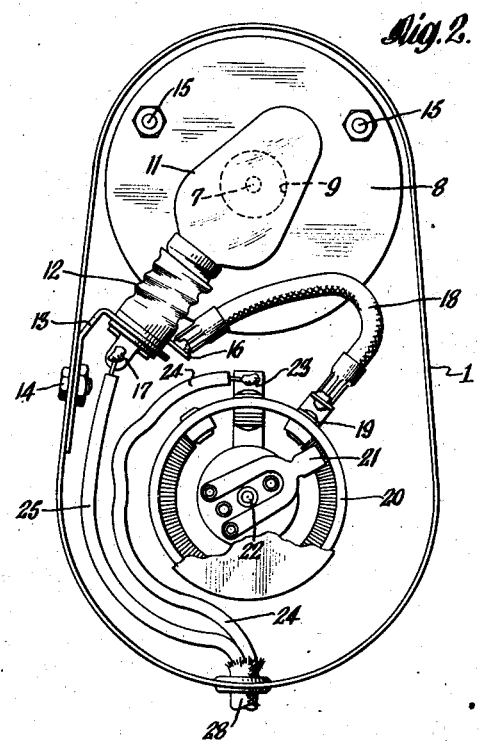
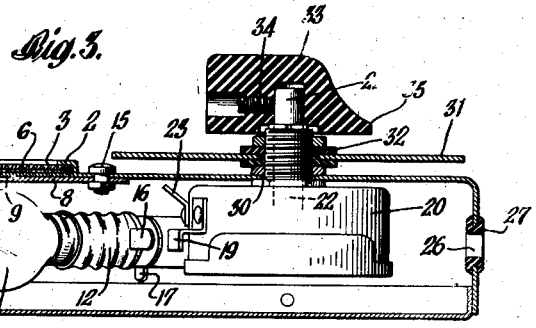
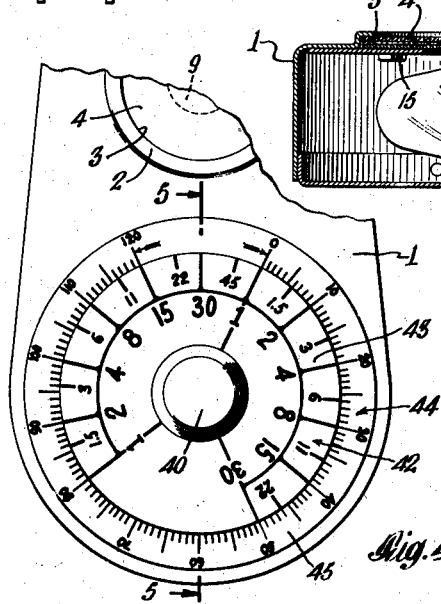
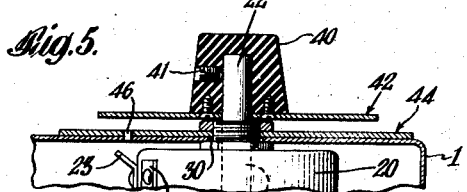
INVENTOR
Artemas Jean Haynes.
BY
Albert M. Austin
ATTORNEY Patented July 20, 1943

2,324,581

UNITED STATES PATENT OFFICE 2,324,581

PHOTOMETER

Artemas Jean Haynes, Jackson Heights, N. Y.

Application June 13, 1939, Serial No. 278,805

2 Claims. (Cl. 88—23)

This invention relates to an improved photometer adapted for use in measuring light intensities over limited areas and is particularly adapted for use in the photographic industry.

In enlarging and printing, it is often desirable to establish certain light intensities either in the film or in the papers and to be able to reproduce these conditions repeatedly at will. Necessarily, the amount of light that can be passed through these films or pieces of paper is relatively low. As a result, it is important to have a device which will give an accurate reading of small changes under such circumstances.

A feature of the present device is that it permits direct comparative light reading by means of a simple rheostat control. The rheostat control may be in series with the filament of an incandescent lamp which serves as the source of illumination for the standard of comparison.

In carrying out these ends, it is desirable in order to obtain reasonable accuracy that the following conditions be properly met. The source of light which forms the standard of comparison and reaches the field upon which the comparison is made should vary in intensities logarithmically with equal linear or circular adjustments of the rheostat or variable resistance control. Thus, if the source of light forming the standard of comparison doubles with the movement of the rheostat control knob over a predetermined distance, it should continue to double at each similar movement throughout the scale.

It is furthermore desirable that the scale upon which the readings are taken should be spread out to include most of the variable resistance control while only varying the light through a relatively small part of the spectral luminosity curve.

It is also desirable that the source of light and the filament thereof be operated only within certain ranges of wave lengths so that the life of the filament may be prolonged and the device may be operated for many hours with no apparent change in its calibration.

As the spectral luminosity curve of an incandescent lamp filament shifts toward the shorter wave lengths with increasing current flow, and attendant increase in temperature, it is desirable to interpose a spectral filter between the source of light forming the standard of comparison and the field upon which the comparison is to be made, to prevent the light reaching the field of comparison from varying in color and to produce a monochromatic illumination curve which can be properly stabilized and compensated in a resistance network to produce the uniform logarithmic light variation desired.

In order to accomplish these ends, a device should be provided which will properly proportion the energizing voltage, filament characteristics of the incandescent lamp, the lamp filament resistance, plus a fixed resistance, plus the variable control resistance, the distance of the incandescent lamp serving as a standard of comparison from the comparison field, the transmission characteristics of the monochromatic filter, and the direct reading logarithmic time scale.

The present invention is particularly adapted to this use and provides a further feature in that it gives a ready means of interpreting the amount or intensity of the light relative to a given scale.

Although the novel features which are believed to be characteristic of this invention will be particularly pointed out in the claims appended hereto, the invention itself, as to its objects and advantages, and the manner in which it may be carried out, may be better undertsood by referring to the following description taken in connection with the accompanying drawing forming a part thereof, in which Fig. 1 is a top plan view of one form of the device of the invention.

Fig. 2 is a plan view of the interior of the device of the invention.

Fig. 3 is a view in cross-section of the device of the invention taken along the line 3—3 of Figure 1.

Fig. 4 is a top plan view of a portion of a modified form of the device of the invention.

Fig. 5 is a view in cross-section of the device of the invention taken along the line 5—5 of Figure 4.

In the following description and in the claims, various details will be identified by specific names for convenience, but they are intended to be as generic in their application as the art will permit. Like reference characters denote like parts in the several figures of the drawing.

The invention comprises generally a case 1, having preferably on one of its broad surfaces a relatively large opening 3 having a bent-over lip portion 2 thereabout. Mounted in this opening and having substantially the same area as the opening, but extending beneath the bent-over lip portion 3 is mounted a transparent, translucent Celluloid protecting member 4. Mounted beneath this member 4 is a semi-opaque disk member 5 which provides a reflecting field 6 in its outer portion. Adjacent the center of the semi-opaque member 5 is a translucent spot 7.

A metal plate 8 is fastened to the case 1 as by the screws 15 beneath the opening 3 and has a smaller opening 9 adjacent its center. Thus, that part of the semi-opaque member 5 which is above the opening 9 in the metal plate 8 comprises a comparison field.

Intermediate the metal plate 8 and the semi-opaque disk member 5 is a monochromatic light filter 39.

Mounted within the case 1 and attached thereto by any suitable means such as the bracket 13 connected to the case 1 by the screw 14 is a socket 12 in which may be mounted a light bulb 11. A terminal 16 on the light socket 12 is connected to a fixed resistance 18 which in turn is connected to a terminal 19 on a rheostat 20. The other terminal 17 of the light socket 12 is connected to a wire 25 which leads from an electric cable 28 which is connected to a suitable source of supply of electricity.

A rheostat contactor 21 is operatively connected to a control column 22 and insulated therefrom. The other terminal 23 on the rheostat so connected to the rheostat contactor 21 is connected at its other end to a wire 24 which leads into the cable 28 and thus to a source of electricity to which it may be connected as by the plug 29. The cable 28 passes through the case 1 through a hole 26 which has thereabout an insulator 27.

The control column 22 passes through a hole 30 in the casing 1 and has attached to it exteriorly of the casing a control knob 33.

Intermediate the control knob 33 and the case 1 and rotatively journaled on the control column 22 is a collar 32 to which is connected a disk 31. The control knob 33 may be secured to the control column 22 by a screw 34. The control knob 33 preferably has a portion 35 thereof in the form of a pointer 35.

The disk 31 may have adjacent its exterior and about its periphery a paper speed or gray scale 36. Intermediate the paper speed or gray scale 36 and the control knob 33 is a light time logarithmic scale 37 which preferably is marked off in a logarithmic progression. One of the screws 15 which holds the plate 8 onto the case 1 may have a slot 38 therein which acts as an indicator for determining what reading shall be taken on the paper speed or gray scale 36.

In lieu of the control knob 33 and disk 31, the photometer may be provided with the scale indicated in Figs. 4 and 5. In this embodiment of the invention, the photometer in all its interior construction and insofar as its comparison field is concerned, is the same as shown and described heretofore.

In this form of the invention, the control column 22 protrudes through the case 1 as in this first form. Attached to the control column 22 as by the screw 41 is a control knob 40 which has attached thereto a disk 42 which turns with the control knob 40 and the control column 22. This disk is preferably provided with a light time scale 43 marked similarly to the light time scale 37 in the first form of the invention.

Beneath the disk 42 and mounted on the case 1 is a second disk 44 secured to the case 1 as by any suitable means such as the rivet 46. This disk has on it adjacent its periphery and visible beyond the periphery of the disk 42, a paper speed or gray scale 45. It is apparent that this scale may be placed directly on the case 1.

In addition to the variations which might ordinarily be expected from the deterioration of the light bulb, there will be a variation in the light intensity as it appears to the eye due to the change from one end of the spectrum toward the other, depending on the light output. Thus, when the current going into the bulb is low, most of the light rays emitted by the bulb will be within the red or low frequency section of the spectrum and as the current is increased, the major portion of the light rays will gradually shift toward the high frequency or blue end of the spectrum. This will cause an irregularity of color change which cannot properly be compensated for in any simple scale which may be provided for reading the light intensity. By providing the monochromatic filter 39 such as is presented in the instant invention, this difficulty is overcome.

It can readily be seen that in ordinary use, an electric bulb will deteriorate and thus the intensity of the light emitted by it will vary for a given amount of current. In the present invention, the effect of this has been minimized by providing the fixed resistance 18 which ordinarily will prevent the light bulb 11 from receiving but a fraction of the current which it is designed to use. As a result, the life of the bulb will be materially prolonged and it will give a practically constant light output for any given amount of current put into it.

In measuring the density of a film or paper, the tone of which it is desired to reproduce or to modify when reproducing the image generally, the film or paper is placed beneath a source of light. The photometer is then placed beneath the paper or film with the translucent spot 7 directly beneath the area the density of which is to be measured.

Unless the intensity of the light passing through the film or paper is equal to that coming from within the photometer, the translucent spot 7 will appear as a spot on the comparison field provided by the semi-opaque member 5. In order to determine the time which will be necessary to expose a piece of paper in order to reproduce this light effect, the disk 31 with its paper speed or gray scale 36 is turned until the figure on the paper scale, which corresponds to the paper speed of the paper on which the reproduction is to be made, is opposite the indicating point 38. The rheostat control knob 33 is then turned until the spot 7 blends in with the comparison field and at this point it is known that the light from the bulb 11 and the light passing through the paper or film to be compared are equal.

A reading is then taken on the scale 37 at the point opposite the indicator 35. This reading will indicate the time which a piece of paper should be exposed under the given source of light to reproduce the desired effect.

In the form of the invention shown in Figs. 4 and 5, the operation is substantially the same. The paper to be compared is placed beneath a source of light and the photometer is placed therebeneath with the translucent spot 7 beneath the portion of the paper which it is desired to reproduce or modify. The rheostat control knob 40 with the disk 42 and the time light scale 43 thereon is turned until the translucent spot disappears, which will be the point where the reflected light and the transmitted light are equal. By then taking a reading on the time light scale at the point opposite the paper speed scale which is to be used, the time required for exposure may be determined.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What is claimed is:

1. A photometer for use in making photographic enlargements from negatives which comprises a casing; a comparison field in the casing, said comparison field having a light transmitting area and a light reflecting area; a lamp mounted within the casing to cast light rays upon said light transmitting area; a shaft rotatably mounted in the casing; means connected with said shaft to vary the intensity of the light cast from said lamp upon said light transmitting area logarithmically upon equal increments of rotation of said shaft for balancing the light cast upon the transmitting area on the inside of the casing with the light reflected from the reflecting area on the outside of the casing; two scales concentric with respect to said shaft and movable relatively to each other, the first scale bearing arithmetically spaced divisions representing paper speeds, the second scale bearing logarithmically spaced divisions representing exposure time, the graduations of the scales being so arranged that the divisions of one scale read upon the divisions of the other scale, one of said scales being rotatable with said shaft, the other scale being stationary, whereby for any given negative the exposure time may be read directly from said scales for different paper speeds when said balance is made.

2. A photometer for use in making photographic enlargements from negatives which comprises a casing; a comparison field in the casing, said comparison field having a light transmitting area in a light reflecting area; a lamp mounted within the casing to cast light rays upon said light transmitting area; a shaft rotatably mounted in the casing; means connected with said shaft to vary the intensity of the light cast from said lamp upon said light transmitting area geometrically upon equal increments of rotation of said shaft for balancing the light cast from said lamp upon the transmitting area with the light reflected from the reflecting area on the outside of the casing; a first scale bearing geometrically spaced divisions representing exposure time, said first scale being concentrically arranged with said shaft and rotatable with the same; a second scale bearing arithmetically spaced divisions representing paper speeds, said second scale being fixed relative to said casing and concentrically arranged relative to said first scale, the graduations of the second scale being adjacent the edge of the first scale so that the divisions of one scale read upon the divisions of the other scale, whereby the required exposure time for any given negative and any predetermined paper speed may be directly read upon a single adjustment of said shaft which balances the transmitted light with the reflected light.

ARTEMAS JEAN HAYNES.